(12) United States Patent
Seidel et al.

(10) Patent No.: US 7,144,935 B2
(45) Date of Patent: Dec. 5, 2006

(54) FLAME-RESISTANT POLYCARBONATE COMPOSITIONS CONTAINING PHOSPHORUS-SILICON COMPOUNDS

(75) Inventors: Andreas Seidel, Dormagen (DE); Michael Wagner, Moers (DE); Jochen Endtner, Köln (DE); Wolfgang Ebenbeck, Köln (DE); Thomas Eckel, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 417 days.

(21) Appl. No.: 10/726,368

(22) Filed: Dec. 3, 2003

(65) Prior Publication Data

US 2004/0110879 A1 Jun. 10, 2004

(30) Foreign Application Priority Data

Dec. 6, 2002 (DE) ............................... 102 57 081

(51) Int. Cl.
*C08K 5/5317* (2006.01)
(52) U.S. Cl. ...................................... 524/130; 524/262
(58) Field of Classification Search ................ 524/130, 524/262
See application file for complete search history.

(56) References Cited

U.S. PATENT DOCUMENTS

| | | | | |
|---|---|---|---|---|
| 3,699,188 A | 10/1972 | Kodama et al. | ............. | 260/865 |
| 4,093,641 A | 6/1978 | Plueddemann | ....... | 260/448.2 E |
| 5,025,065 A * | 6/1991 | Tacke et al. | ................. | 524/611 |
| 5,061,745 A | 10/1991 | Wittmann et al. | .......... | 524/139 |
| 5,204,394 A | 4/1993 | Gosens et al. | ................ | 524/125 |
| 5,576,377 A * | 11/1996 | El Sayed et al. | ............ | 524/495 |
| 5,672,645 A | 9/1997 | Eckel et al. | ................. | 524/127 |
| 5,973,041 A | 10/1999 | Campbell et al. | ............ | 524/117 |
| 6,001,921 A | 12/1999 | Serizawa et al. | ............ | 524/506 |
| 6,111,002 A * | 8/2000 | Doring et al. | ............... | 524/262 |
| RE36,902 E | 10/2000 | Eckel et al. | ................. | 524/127 |
| 6,221,939 B1 | 4/2001 | Campbell et al. | ............ | 524/117 |
| 6,388,046 B1 | 5/2002 | Campbell et al. | ............ | 528/198 |
| 6,414,060 B1 | 7/2002 | McEuen et al. | .............. | 524/136 |
| 6,433,050 B1 | 8/2002 | Shinomiya et al. | .......... | 524/265 |
| 6,576,706 B1 | 6/2003 | Nodera et al. | ................. | 525/67 |
| 6,602,938 B1 | 8/2003 | Iji et al. | ...................... | 524/164 |
| 6,753,365 B1 * | 6/2004 | Brown et al. | ................ | 524/123 |
| 2002/0019466 A1 | 2/2002 | Falcone et al. | ............. | 524/100 |
| 2002/0099160 A1 | 7/2002 | Shiping | ........................ | 528/10 |
| 2003/0191245 A1 | 10/2003 | Nodera et al. | ............... | 525/100 |

FOREIGN PATENT DOCUMENTS

| | | |
|---|---|---|
| CA | 2 383 681 | 3/2001 |
| EP | 1 116 772 | 7/2001 |
| EP | 728 811 | 9/2003 |
| JP | 2001-247582 | 9/2001 |
| WO | 00/46299 | 8/2000 |

OTHER PUBLICATIONS

Patent Abstracts of Japan vol. 2000. No. 26, Jul. 1, 2002 & JP 2001 247582 A.
(Nippon Unicar Co Ltd), Sep. 11, 2001.
Phosphorus, Sulfur, and Silicon, 68, (month unavailable) 1992, pp. 107-114, K. Troev.
S. Shenkov and U. Delimarinova, "Synthesis of Phosphorus And Silicon Containing Monomers and Oligomers With End Phosphonate and Phosphate Groups".

* cited by examiner

*Primary Examiner*—Peter Szekely
(74) *Attorney, Agent, or Firm*—Joseph C. Gil; Aron Preis

(57) ABSTRACT

A flame resistant poly(ester)carbonate composition is disclosed. The composition contains at least one phosphorus-silicon compound, the compound has a phosphorus content of 1 to 20% and a silicon content of 1 to 20%, and is characterized in that its weight loss (assessed by thermogravimetric analysis under nitrogen inert gas at a heating rate of 20° K/min,) at 280° C. is less than 30%. The preferred phosphorus-silicon compound is produced by thermal oligomerization from phosphorylated silanes.

16 Claims, No Drawings

FLAME-RESISTANT POLYCARBONATE COMPOSITIONS CONTAINING PHOSPHORUS-SILICON COMPOUNDS

FIELD OF THE INVENTION

The present invention concerns thermoplastic molding compositions and more particularly flame resistant compositions containing polycarbonate and a phosphorus-silicon compound.

SUMMARY OF THE INVENTION

A flame resistant poly(ester)carbonate composition is disclosed. The composition contains at least one phosphorus-silicon compound, the compound has a phosphorus content of 1 to 20% and a silicon content of 1 to 20%, and is characterized in that its weight loss (assessed by thermogravimetric analysis under nitrogen inert gas at a heating rate of 20° K/min,) at 280° C. is less than 30%. The preferred phosphorus-silicon compound is produced by thermal oligomerization from phosphorylated silanes.

TECHNICAL BACKGROUND OF THE INVENTION

In order to satisfy the stringent requirements that exist in many areas of application regarding the flame resistance of the materials used, plastics generally have to contain flame retardants. A large number of substances that are suitable as flame retardants are known and are also commercially available. Halogen compounds, phosphorus compounds, silicon compounds, zinc borates and metal hydroxides may be cited by way of example. By virtue of the often more advantageous secondary effects of fire in terms of smoke density, toxicity and corrosiveness and in particular for ecotoxicological reasons, the use of halogen-free flame retardant systems is preferred.

Flame-resistant polycarbonate compositions are known in principle and are used in a variety of areas of application, in particular in the electrical and electronics sector, in data technology, in construction and in the aircraft and railway industry. Phosphorus compounds, phosphorus-nitrogen compounds and silicon compounds are described in particular as suitable halogen-free flame retardants.

The use of phosphorus compounds, in particular of monomeric and oligomeric phosphoric acid esters as flame retardants in PC/ABS compositions is described for example in EP-A 0 345 522, EP-A 0 363 608 and EP-A 0 640 655. In addition to their suitability as a flame retardant additive, phosphoric acid esters display a plasticising action. The heat resistance of the compositions is therefore substantially reduced in some cases if they are rendered flame resistant.

The use of phosphorus-nitrogen compounds, such as phosphonate amines, phosphazenes and phosphoramidates as flame retardants in polycarbonate compositions is described for example in WO 01/18106, EP-A 1 116 772, EP-A 0 728 811, U.S. Pat. No. 6,414,060, U.S. Pat. No. 5,973,041 and WO 00/12612. In comparison to the aforementioned phosphoric acid esters these compounds are generally far less plasticising, but at the elevated temperatures that are typical in the compounding and processing of polycarbonate compositions they have a tendency towards thermal decomposition and/or degradation of the polycarbonate.

The use of silicon compounds, in particular of special silicones, as flame retardants in polycarbonate compositions is described for example in U.S. Pat. No. 6,001,921, WO 99/28387, WO 00/39217, WO 00/46299 and WO 00/64976. The silicones used may be incorporated into polycarbonate without any significant reduction in molecular weight, are thermally stable and have little or no plasticising action on the polycarbonate. The disadvantage of silicones is their comparatively low flame retardant efficiency, which limits their use to pure, i.e. non-impact-modified polycarbonate. The use of silicones alone to render blends such as PC/ABS blends flame retardant, at least by any economically viable means, is not possible.

Due to their lack of adequate efficiency, silicones are frequently used in combination with other flame retardants, such as the aforementioned phosphorus compounds for example. US 2002/0099160 A1 is cited here by way of example, wherein a combination of a special silicone and an oligomeric phosphoric acid ester is described as a flame retardant package for PC/ABS blends. The addition of silicone allows the amount of phosphate needed for a flame retardant effect to be reduced and hence its undesirable plasticising effect in some high-temperature applications to be limited, but not absolutely prevented.

JP-A 2001-247582 describes phosphorylated polyorganosiloxanes as low-plasticising flame retardants for polycarbonate and PC/ABS blends. Due to their poor compatibility with the polycarbonate and their in some cases high volatility at the conventional processing temperatures, the compounds used here as a flame retardant additive tend to bleed, which may lead to problems in injection molding in particular because of downtimes.

The object of the present invention was therefore to develop novel phosphorus-silicon compounds having high flame retardant efficiency, high thermal stability, low volatility and good compatibility with aromatic polycarbonates and to use them to provide flame-resistant polycarbonate compositions having improved processing characteristics.

DETAILED DESCRIPTION OF THE INVENTION

Surprisingly it was found that polycarbonate compositions to which special phosphorus-silicon compounds are added display the desired range of properties.

The present invention therefore provides polycarbonate compositions containing low-volatility phosphorus-silicon compounds having a phosphorus content of 1 to 20 wt. %, in particular 3 to 17 wt. %, preferably 5 to 15 wt. %, particularly preferably 7 to 13 wt. %, and a silicon content of 1 to 20 wt. %, in particular 3 to 17 wt. %, preferably 5 to 15 wt. %, particularly preferably 7 to 13 wt. %, which at 280° C. display a volatile content by mass of less than 30 wt. %, preferably less than 20 wt. %, particularly preferably less than 15 wt. %, in particular less than 10 wt. %, most particularly preferably less than 5 wt. % (assessed in a thermogravimetric analysis under nitrogen inert gas at a heating-up rate of 20 K/min), the cited weights referring in each case to the phosphorus-silicon compound.

Production processes for phosphorus-silicon compounds that are suitable according to the invention as a flame retardant or flame retardant synergist for polycarbonate compositions are known in principle. Examples of processes for producing such compounds may be found in *Phosphorus, Sulfur, and Silicon* 68 (1992) 107–114 and the literature cited therein. The processes described therein and resulting compounds should be regarded as examples only, however, and in no way restrict the scope of the present invention.

Such phosphorus-silicon compounds that may be obtained by thermally induced oligomerisation from phosphorylated silanes, for example, are preferably used.

The phosphorylated silanes are produced for example with liberation of hydrogen halide, chloromethane or chloroethane in the reaction of phosphonic acid esters having the general formula (I) with halosilanes having the general formula (II),

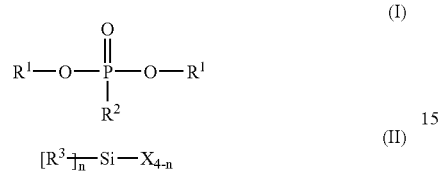

(I)

(II)

wherein
n represents a number between 0 and 3, preferably 2,
X represents a halogen atom, preferably chlorine or bromine,
$R^1$ mutually independently represents hydrogen or $C_1$–$C_4$ alkyl, preferably methyl or ethyl,
$R^2$ represents
  a) an optionally by aryl (e.g. phenol) or alkyl (e.g. $C_1$–$C_4$-alkyl) substituted aryl radical, preferably phenyl, or
  b) an optionally by aryl (e.g. phenyl) substituted alkyl radical, preferably methyl, ethyl, propyl or butyl, or
  c) an optionally by aryl (e.g. phenyl) or alkyl (e.g. $C_1$–$C_4$-alkyl) substituted aryloxy radical, preferably phenoxy, or
  d) an optionally by aryl (e.g. phenyl) substituted alkoxy radical, preferably methoxy, ethoxy or propoxy, or
  e) hydrogen, and
$R^3$ mutually independently represents alkyl radicals, or aryl radicals. The preferred alkyl radicals are $C_1$–$C_8$ alkyl, in particular methyl, ethyl, propyl and butyl, aryl radicals. The aryl radicals may be substituted with alkyl, preferably with $C_1$–$C_4$ alkyl radicals. The preferred aryl radicals are phenyl, cresyl, xylenyl, propyl phenyl or butyl phenyl.

The phosphorylated silanes or alternatively also mixtures of such phosphorylated silanes are thermally oligomerised at temperatures above 70° C., in particular above 100° C., preferably above 130° C., the resulting monomeric phosphonate being removed from the reaction mixture by continuous distillation in vacuo.

Examples of phosphorus-silicon compounds that are particularly preferably suitable as a flame retardant additive are those having the general formula (III),

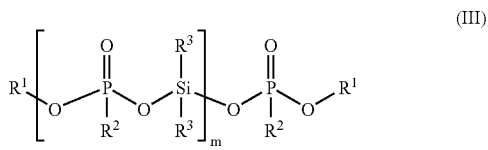

(III)

wherein
$R^1$, $R^2$ and $R^3$ have the meaning cited above and
m denotes a numerical value from 2 to 1000, preferably from 2 to 100, in particular from 2 to 20, by preference from 2 to 10, and wherein the radicals $R^2$ and $R^3$ may vary within the polymer chain from one monomer unit to another.

Such compounds having the general formula (III) in which at least 10 mol %, preferably at least 20 mol %, in particular at least 30 mol %, particularly preferably at least 40 mol %, most particularly preferably at least 50 mol % of the substituents $R^2$ and $R^3$ are aryl or aryloxy radicals, preferably phenyl or phenoxy, are used in particular.

Phosphorus-silicon compounds that are preferably used as a flame retardant additive are furthermore those having the general formula (IV),

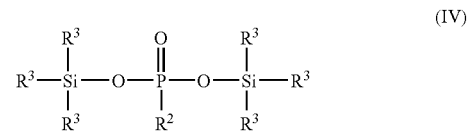

(IV)

wherein
$R^2$ has the meaning cited above and
$R^3$ stands for the same or different aryl radicals, in particular for phenyl, cresyl and xylyl.

The phosphorylated silanes having formula (IV) may likewise be obtained with liberation of hydrogen halide, chloromethane or chloroethane from the reaction of corresponding phosphonic acid esters having the general formula (I) with corresponding halosilanes having the general formula (II).

Naturally, mixtures of different phosphorus-silicon compounds according to the invention may also be used as flame retardants.

The phosphorus-silicon compounds are used in the polycarbonate compositions to be rendered flame resistant in quantities of 0.05 to 30 parts by weight, preferably 0.1 to 20 parts by weight, in particular 0.2 to 15 parts by weight, particularly preferably 0.3 to 10 parts by weight, most particularly preferably 0.5 to 5 parts by weight, most preferably of all 1.5 to 8 parts by weight, relative to 100 parts by weight of polycarbonate composition. The optimum amount of compounds according to the invention to use depends on the nature of the polycarbonate composition, i.e. on any addition of other polymers and/or impact modifiers, the nature of auxiliary substances additionally used and the type of compound used according to the invention.

The polycarbonate compositions that may be rendered flame resistant with the phosphorus-silicon compounds contain A) 60 to 100 parts by weight, preferably 70 to 100 parts by weight, in particular 80 to 100 parts by weight, particularly preferably 90 to 100 parts by weight, most particularly preferably 93 to 100 parts by weight of aromatic polycarbonate and/or polyester carbonate, B) 0 to 40 parts by weight, preferably 0 to 30 parts by weight, in particular 0 to 25 parts by weight, particularly preferably 0 to 10 parts by weight, most particularly preferably 0 to 5 parts by weight of at least one polymer selected from vinyl (co)polymers, rubber-modified vinyl (co)polymers and aromatic polyesters, C) 0 to 5 parts by weight, preferably 0 to 2 parts by weight, in particular 0 to 1 parts by weight, particularly preferably 0 to 0.5 parts by weight, most particularly preferably 0.2 to 0.5 parts by weight of fluorinated polyolefin and D) up to 20 parts by weight, preferably up to 15 parts by weight, in particular up to 10 parts by weight, particularly preferably up to 5 parts by weight, most particularly preferably up to 2 parts by weight of other polymers and/or conventional polymer additives, the parts by weight of components A to D adding to 100.

Component A

Aromatic polycarbonates and/or aromatic polyester carbonates in accordance with component A that are suitable according to the invention are known from the literature or may be prepared by methods known from the literature, such as the interfacial polycondensation process or the melt polymerisation process for example (for the preparation of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates are prepared for example by reacting diphenols with carbonic acid halides, preferably phosgene, and/or with aromatic dicarboxylic acid dihalides, preferably benzenedicarboxylic acid dihalides, by the interfacial polycondensation process, optionally using chain terminators, for example monophenols, and optionally using trifunctional or polyfunctional branching agents, for example triphenols or tetraphenols.

Diphenols for the preparation of the aromatic polycarbonates and/or aromatic polyester carbonates are preferably those having the formula (V)

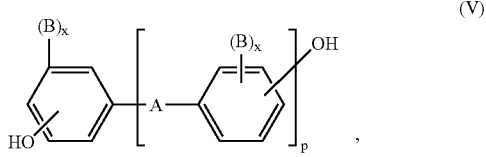

(V)

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —$SO_2$—, $C_6$ to $C_{12}$ arylene, to which other aromatic rings optionally containing heteroatoms may be condensed, or a radical having the formula (VI) or (VII)

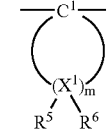

(VI)

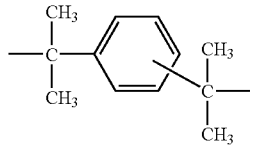

(VII)

B is $C_1$ to $C_{12}$ alkyl, preferably methyl, halogen, preferably chlorine and/or bromine x is mutually independently 0, 1 or 2, p is 1 or 0, and $R^5$ and $R^6$ may be individually selected for each $X^1$ and mutually independently denote hydrogen or $C_1$ to $C_6$ alkyl, preferably hydrogen, methyl or ethyl, $X^1$ denotes carbon and m denotes a whole number from 4 to 7, preferably 4 or 5, with the proviso that in at least one $X^1$ atom $R^5$ and $R^6$ are both alkyl.

Preferred diphenols are hydroquinone, resorcinol, dihydroxydiphenols, bis(hydroxyphenyl)-$C_1$–$C_5$-alkanes, bis(hydroxyphenyl)-$C_5$–$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl) diisopropyl benzenes along with their ring-brominated and/or ring-chlorinated derivatives.

Particularly preferred diphenols are 4,4'-dihydroxydiphenyl, bisphenol A, 2,4-bis-(4-hydroxyphenyl)-2-methyl butane, 1,1-bis-(4-hydroxyphenyl) cyclohexane, 1,1-bis-(4-hydroxyphenyl-3,3,5-trimethyl cyclohexane, 4,4'-dihydroxydiphenyl sulfide, 4,4'-dihydroxydiphenyl sulfone and dibrominated and tetrabrominated or chlorinated derivatives thereof such as e.g. 2,2-bis-(3-chloro-4-hydroxyphenyl) propane, 2,2-bis-(3,5-dichloro-4-hydroxyphenyl) propane or 2,2-bis-(3,5-dibromo-4-hydroxyphenyl) propane. 2,2-bis-(4-hydroxyphenyl) propane (bisphenol A) is especially preferred.

The diphenols may be used individually or in any combination whatsoever. The diphenols are known from the literature or may be obtained by methods known from the literature.

Suitable chain terminators for the preparation of the thermoplastic, aromatic polycarbonates are for example phenol, p-chlorophenol, p-tert.-butyl phenol or 2,4,6-tribromophenol, as well as long-chain alkyl phenols such as 4-(1,3-tetramethyl butyl) phenol according to DE-A 2 842 005 or monoalkyl phenol or dialkyl phenols having a total of 8 to 20 C atoms in the alkyl substituents, such as 3,5-di-tert.-butyl phenol, p-iso-octyl phenol, p-tert.-octyl phenol, p-dodecyl phenol and 2-(3,5-dimethyl heptyl) phenol and 4-(3,5-dimethyl heptyl) phenol. The amount of chain terminators to be used is generally between 0.5 mol % and 10 mol %, relative to the molar sum of diphenols used in each case.

The thermoplastic, aromatic polycarbonates may be branched by known means, and preferably by the incorporation of 0.05 to 2.0 mol %, relative to the sum of diphenols used, of trifunctional or polyfunctional compounds, for example those having three and more phenolic groups.

Both homopolycarbonates and copolycarbonates are suitable. 1 to 25 wt. %, preferably 2.5 to 25 wt. % (relative to the total amount of diphenols to be used) of polydiorganosiloxanes having hydroxyaryloxy terminal groups may also be used in the production of copolycarbonates according to the invention in accordance with component A. These are known (e.g. U.S. Pat. No. 3,419,634) or may be produced by methods known from the literature. The production of polydiorganosiloxane-containing copolycarbonates is described e.g. in DE-A 3 334 782.

In addition to the bisphenol A homopolycarbonates, preferred polycarbonates are the copolycarbonates of bisphenol A having up to 15 mol %, relative to the molar sums of diphenols, of other diphenols cited as being preferred or particularly preferred.

Aromatic dicarboxylic acid dihalides for the production of aromatic polyester carbonates are preferably the di-acid dichlorides of isophthalic acid, terephthalic acid, diphenyl ether-4,4'-dicarboxylic acid and naphthaline-2,6-dicarboxylic acid.

Mixtures of aromatic dicarboxylic acid dihalides may also be used, mixtures of the di-acid dichlorides of isophthalic acid and terephthalic acid in a ratio between 1:20 and 20:1 being particularly preferred.

In the production of polyester carbonates a carbonic acid halide, preferably phosgene, is also incorporated as a bifunctional acid derivative.

Examples of chain terminators for the production of aromatic polyester carbonates also include, in addition to the monophenols already cited, chloroformic acid esters thereof and the acid chlorides of aromatic monocarboxylic acids, which may optionally be substituted by $C_1$ to $C_{22}$ alkyl groups or by halogen atoms, along with aliphatic $C_2$ to $C_{22}$ monocarboxylic acid chlorides.

The quantity of chain terminators in each case is 0.1 to 10 mol %, relative to moles of diphenols in the case of phenolic chain terminators and to moles of dicarboxylic acid dichlorides in the case of monocarboxylic acid chloride chain terminators.

The aromatic polyester carbonates may also contain incorporated aromatic hydroxycarboxylic acids.

The aromatic polyester carbonates may be both linear and branched by known means (see also DE-A 2 940 024 and DE-A 3 007 934 in this connection).

Examples of branching agents that may be used include trifunctional or polyfunctional carboxylic acid chlorides, such as trimesic acid trichloride, cyanuric acid trichloride, 3,3'-,4,4'-benzophenone tetracarboxylic acid tetrachloride, 1,4,5,8-naphthaline tetracarboxylic acid tetrachloride or pyromellitic acid tetrachloride, in quantities of 0.01 to 1.0 mol % (relative to dicarboxylic acid dichlorides used) or trifunctional or polyfunctional phenols, such as phloroglucinol, 4,6-dimethyl-2,4,6-tri-(4-hydroxyphenyl) hept-2-ene, 4,4-dimethyl-2,4,6-tri-(4-hydroxyphenyl) heptane, 1,3,5-tri-(4-hydroxyphenyl) benzene, 1,1,1-tri-(4-hydroxyphenyl) ethane, tri-(4-hydroxyphenyl) phenyl methane, 2,2-bis-[4,4-bis-(4-hydroxyphenyl) cyclohexyl] propane, 2,4-bis-(4-hydroxyphenyl isopropyl) phenol, tetra-(4-hydroxyphenyl) methane, 2,6-bis-(2-hydroxy-5-methylbenzyl)-4-methyl phenol, 2-(4-hydroxyphenyl)-2-(2,4-dihydroxyphenyl) propane, tetra-(4-[4-hydroxyphenyl isopropyl] phenoxy) methane, 1,4-bis-[4,4'-dihydroxytriphenyl] methyl] benzene, in quantities of 0.01 to 1.0 mol %, relative to diphenols used. Phenolic branching agents may be included with the diphenols, acid chloride branching agentsmay be introduced together with the acid dichlorides.

The proportion of carbonate structural units in the thermoplastic, aromatic polyester carbonates may vary widely. The proportion of carbonate groups is preferably up to 100 mol %, in particular up to 80 mol %, particularly preferably up to 50 mol %, relative to the sum of ester groups and carbonate groups. Both the ester and the carbonate component of the aromatic polyester carbonates may be in the form of blocks or randomly distributed in the polycondensate.

The thermoplastic, aromatic poly(ester) carbonates have weight-average molecular weights ($M_w$, measured e.g. by ultracentrifuge, light-scattering measurement or gel permeation chromatography) of 10,000 to 200,000, preferably 15,000 to 80,000, particularly preferably 17,000 to 40,000.

The thermoplastic, aromatic polycarbonates and polyester carbonates may be used alone or in any combination.

Component B

The polycarbonate compositions according to the invention may contain as component B at least one other polymer chosen from the group of vinyl (co)polymers, rubber-modified vinyl (co)polymers and (preferably aromatic) polyesters.

Preferred rubber-modified vinyl (co)polymers are graft polymers of at least one vinyl monomer on at least one rubber having a glass transition temperature <10° C. as graft base, in particular such graft polymers of B.1 5 to 95 wt. %, preferably 10 to 90 wt. %, in particular 20 to 70 wt. % of monomers of a mixture comprising B.1.1 50 to 99 wt. %, preferably 50 to 90 wt. %, particularly preferably 55 to 85 wt. %, most particularly preferably 60 to 80 wt. % of vinyl aromatics and/or ring-substituted vinyl aromatics (such as e.g. styrene, α-methyl styrene, p-methyl styrene, p-chlorostyrene) and/or methacrylic acid ($C_1$–$C_8$) alkyl esters (such as methyl methacrylate, ethyl methacrylate) and B.1.2 1 to 50 wt. %, preferably 10 to 50 wt. %, particularly preferably 15 to 45 wt. %, most particularly preferably 20 to 40 wt. % of vinyl cyanides (unsaturated nitriles such as acrylonitrile and methacrylonitrile) and/or (meth)acrylic acid ($C_1$–$C_8$) alkyl esters (such as methyl methacrylate, n-butyl acrylate, t-butyl acrylate) and/or derivatives (such as anhydrides and imides) of unsaturated carboxylic acids (for example maleic anhydride and N-phenyl maleinimide) on B.2 95 to 5 wt. %, preferably 90 to 10 wt. %, in particular 80 to 30 wt. % of one or more rubbers having glass transition temperatures <10° C., preferably <0° C., particularly preferably <–20° C. as graft base.

The graft base generally has a mean particle size ($d_{50}$ value) of 0.05 to 10 μm, preferably 0.1 to 5 μm, particularly preferably 0.2 to 1 μm.

The mean particle size $d_{50}$ is the diameter above and below which respectively 50 wt. % of the particles lie. It may be determined by ultracentrifuge measurement (W. Scholtan, H. Lange, Kolloid, Z. und Z. Polymere 250 (1972), 782–1796).

Preferred monomers B.1.1 are selected from at least one of the monomers styrene, α-methyl styrene and methyl methacrylate, preferred monomers B.1.2 are selected from at least one of the monomers acrylonitrile, maleic anhydride and methyl methacrylate.

Particularly preferred monomers are styrene and acrylonitrile.

Suitable graft bases B.2 for the graft polymers are for example diene rubbers, EP(D)M rubbers, i.e. those based on ethylene/propylene and optionally diene, acrylate, polyurethane, silicone, chloroprene and ethylene/vinyl acetate rubbers, as well as composite rubbers consisting of two or more of the above systems.

Preferred graft bases are diene rubbers. Diene rubbers within the meaning of the present invention are those based e.g. on butadiene, isoprene, etc. or mixtures of diene rubbers or copolymers of diene rubbers or mixtures thereof with other copolymerisable monomers, such as e.g. butadiene-styrene copolymers, with the proviso that the glass transition temperature of the graft base is <10° C., preferably <0° C., particularly preferably <–10° C.

Pure polybutadiene rubber is particularly preferred.

Particularly preferred graft polymers are e.g. ABS polymers (emulsion, bulk and suspension ABS), such as are described e.g. in DE-A 2 035 390 (=U.S. Pat. No. 3,644,574) or in DE-A 2 248 242 (=GB-PS 1 409 275) or in Ullmanns Enzyklopadie der Technischen Chemie, Vol. 19 (1980), p. 280 ff. The gel content of the graft base is preferably at least 30 wt. %, in particular at least 40 wt. %.

The gel content of the graft base is determined at 25° C. in toluene (M. Hoffmann, H. Kromer, R. Kuhn, Polymeranalytik I and II, Georg Thieme-Verlag, Stuttgart 1977).

The graft copolymers may be produced by radical polymerization, e.g. by emulsion, suspension, solution or bulk polymerization. They are preferably produced by emulsion or bulk polymerization.

Particularly suitable graft rubbers are also ABS polymers produced by redox initiation with an initiator system comprising organic hydroperoxide and ascorbic acid according to U.S. Pat. No. 4,937,285.

Acrylate rubbers that are suitable as the graft base are preferably polymers of acrylic acid alkyl esters, optionally also copolymers having up to 40 wt. %, relative to the graft base, of other polymerisable, ethylenically unsaturated monomers. The preferred polymerisable acrylic acid esters include $C_1$–$C_8$ alkyl esters, for example methyl, ethyl, butyl, n-octyl and 2-ethylhexyl ester; haloalkyl esters, preferably halogen $C_1$–$C_8$ alkyl esters, such as chloroethyl acrylate, and mixtures of these monomers.

Monomers having more than one polymerisable double bond may be copolymerized for crosslinking. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as divinyl and trivinyl benzenes; but also triallyl phosphate and diallyl phthalate.

Preferred crosslinking monomers are allyl methacrylate, ethylene glycol dimethacrylate, diallyl phthalate and heterocyclic compounds displaying at least three ethylenically unsaturated groups.

Particularly preferred crosslinking monomers are the cyclic monomers triallyl cyanurate, triallyl isocyanurate, triacryloyl hexahydro-s-triazine, triallyl benzenes. The quantity of crosslinking monomers is preferably 0.02 to 5, in particular 0.05 to 2 wt. %, relative to the graft base.

In the case of cyclic crosslinking monomers having at least three ethylenically unsaturated groups it is advantageous to restrict the quantity to below 1 wt. % of the graft base.

Preferred "other" polymerisable, ethylenically unsaturated monomers which may optionally serve to produce the graft base in addition to the acrylic acid esters are e.g. acrylonitrile, styrene, α-methyl styrene, acrylamides, vinyl $C_1$–$C_6$ alkyl ethers, methyl methacrylate, butadiene. Preferred acrylate rubbers as the graft base are emulsion polymers displaying a gel content of at least 60 wt. %.

Other suitable graft bases are silicone rubbers having graft-active sites, such as are described in DE-A 3 704 657, DE-A 3 704 655, DE-A 3 631 540 and DE-A 3 631 539.

Preferred suitable vinyl (co)polymers are such polymers of at least one monomer from the group of vinyl aromatics, vinyl cyanides (unsaturated nitriles), (meth)acrylic acid ($C_1$ to $C_8$) alkyl esters, unsaturated carboxylic acids and derivatives (such as anhydrides and imides) of unsaturated carboxylic acids.

Particularly suitable are (co)polymers comprising 50 to 99, preferably 60 to 80 wt. % of vinyl aromatics and/or ring-substituted vinyl aromatics, such as e.g. styrene, α-methyl styrene, p-methyl styrene, p-chlorostyrene, and/or methacrylic acid ($C_1$ to $C_8$) alkyl esters, such as methyl methacrylate, ethyl methacrylate, and 1 to 50, preferably 20 to 40 wt. % of vinyl cyanides (unsaturated nitriles) such as acrylonitrile and methacrylonitrile and/or (meth)acrylic acid ($C_1$–$C_8$) alkyl esters (such as methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenyl maleinimide).

The (co)polymers are resinous and thermoplastic.

The copolymer comprising styrene and acrylonitrile along with polymethyl methacrylate is particularly preferred.

The (co)polymers are known and may be produced by radical polymerisation, in particular by emulsion, suspension, solution or bulk polymerisation. The (co)polymers preferably have molecular weights $M_w$ (weight average, determined by light scattering or sedimentation) of between 15,000 and 200,000.

Preferably suitable polyesters are polyalkylene terephthalates. They are reaction products of aromatic dicarboxylic acids or reactive derivatives thereof, such as dimethyl esters or anhydrides, and aliphatic, cycloaliphatic or araliphatic diols and mixtures of these reaction products.

Preferred polyalkylene terephthalates contain at least 80 wt. %, preferably at least 90 wt. %, relative to the dicarboxylic acid component, of terephthalic acid radicals and at least 80 wt. %, preferably at least 90 mol %, relative to the diol component, of ethylene glycol and/or butanediol-1,4 radicals.

In addition to terephthalic acid radicals, the preferred polyalkylene terephthalates may contain up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as radicals of phthalic acid, isophthalic acid, naphthaline-2,6-dicarboxylic acid, 4,4'-diphenyl dicarboxylic acid, succinic acid, adipic acid, sebacic acid, azelaic acid, cyclohexane diacetic acid.

In addition to ethylene glycol or butanediol-1,4 radicals, the preferred polyalkylene terephthalates may contain up to 20 mol %, preferably up to 10 mol %, of other aliphatic diols having 3 to 12 C atoms or cycloaliphatic diols having 6 to 21 C atoms, e.g. radicals of propanediol-1,3, 2-ethyl propanediol-1,3, neopentyl glycol, pentanediol-1,5, hexanediol-1,6, cyclohexane dimethanol-1,4, 3-ethyl pentanediol-2,4, 2-methyl pentanediol-2,4, 2,2,4-trimethyl pentanediol-1,3, 2-ethyl hexanediol-1,3, 2,2-diethyl propanediol-1,3, hexanediol-2,5, 1,4-di-(β-hydroxy-ethoxy)benzene, 2,2-bis-(4-hydroxycyclohexyl) propane, 2,4-dihydroxy-1,1,3,3-tetramethyl cyclobutane, 2,2-bis-(4-β-hydroxyethoxyphenyl) propane and 2,2-bis-(4-hydroxypropoxyphenyl) propane (DE-A 2 407 674, 2 407 776, 2 715 932).

The polyalkylene terephthalates may be branched by incorporating relatively small amounts of trihydric or tetrahydric alcohols or tribasic or tetrabasic carboxylic acids, e.g. according to DE-A 1 900 270 and U.S. Pat. No. 3,692,744. Examples of preferred branching agents are trimesic acid, trimellitic acid, trimethylol ethane and propane and pentaerythritol.

Particularly preferred are polyalkylene terephthalates produced solely from terephthalic acid and reactive derivatives thereof (e.g. dialkyl esters thereof) and ethylene glycol and/or butanediol-1,4, and mixtures of these polyalkylene terephthalates.

Preferred mixtures of polyalkylene terephthalates contain 0 to 50 wt. %, preferably 0 to 30 wt. %, of polybutylene terephthalate and 50 to 100 wt. %, preferably 70 to 100 wt. %, of polyethylene terephthalate. Polyethylene terephthalate is particularly preferred.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates may be produced by known methods (e.g. Kunststoff-Handbuch, Volume VIII, page 695 ff., Carl-Hanser-Verlag, Munich 1973).

Component C

Fluorinated polyolefins are optionally used in the polycarbonate compositions as so-called anti-dripping agents, which reduce the tendency of the material to drip as it burns in the event of a fire.

Fluorinated polyolefins are known and described for example in EP-A 0 640 655. They are sold by DuPont, for example, under the brand name Teflon® 30N.

The fluorinated polyolefins may be used both in pure form and in the form of a coagulated mixture of emulsions of the fluorinated polyolefins with emulsions of the graft polymers or with an emulsion of a copolymer (according to component B), preferably on a styrene/acrylonitrile basis or polymethyl methacrylate basis, the fluorinated polyolefin being mixed as an emulsion with an emulsion of the graft polymer or copolymer and then coagulated.

The fluorinated polyolefins may further be used as a pre-compound with the graft polymer or a copolymer, preferably on a styrene/acrylonitrile or polymethyl methacrylate basis. The fluorinated polyolefins are mixed as a powder with a powder or pellets of the graft polymer or copolymer and compounded in the melt, generally at temperatures of 200 to 330° C., in conventional units such as internal mixers, extruders or twin screws.

The fluorinated polyolefins may also be used in the form of a masterbatch, which is produced by emulsion polymerisation of at least one monoethylenically unsaturated monomer in the presence of an aqueous dispersion of the fluorinated polyolefin. Preferred monomer components are styrene, acrylonitrile, methyl methacrylate and mixtures thereof. The polymer is used as a free-flowing powder after acid precipitation and subsequent drying.

The coagulates, pre-compounds or masterbatches conventionally have solids contents of fluorinated polyolefin of 5 to 95 wt. %, preferably 7 to 80 wt. %, in particular 8 to 60 wt. %. The aforementioned concentrations of component C that are used relate to the fluorinated polyolefin.

Component D

As component D the polycarbonate compositions may contain other polymers and/or polymer additives.

Examples of other polymers are in particular those that may display a synergistic action in the event of a fire by supporting the formation of a stable carbon layer. They are preferably polyphenylene oxides and sulfides, epoxy and phenolic resins, novolaks and polyethers.

Heat stabilisers, hydrolysis stabilisers, light stabilisers, flow control agents and processing aids, lubricants and release agents, UV absorbers, antioxidants, antistatics, preservatives, coupling agents, fibrous or particulate fillers and reinforcing agents, dyes, pigments, nucleating agents, impact modifiers, foaming agents, processing aids, other flame-retarding additives and agents to reduce smoke development, together with mixtures of the cited additives, may be used as possible polymer additives.

Examples of additional flame-retarding additives are particularly and preferably known phosphorus-containing compounds such as monomeric and oligomeric phosphoric and phosphonic acid esters, phosphonate amines, phosphoramidates and phosphazenes, silicones and optionally fluorinated alkyl or aryl sulfonic acid salts. Such compounds are adequately described in the patent applications cited in the prior art for this application. Furthermore, inorganic particles of all types in nanoscale form, siliceous minerals such as talc and wollastonites, inorganic borates such as zinc borate, tin compounds such as zinc stannates and zinc hydroxy stannates and boron phosphorus oxide are particularly suitable as flame retardant synergists and smoke suppressants.

The compositions according to the invention are produced by mixing the various components A–D with the phosphorus-silicon compounds by known means and melt compounding and melt extruding them at temperatures of 200° C. to 300° C. in conventional units such as internal mixers, extruders and twin screws.

The individual constituents may be mixed by known means both successively and simultaneously, both at around 20° C. (room temperature) and at elevated temperature.

The compositions according to the invention may be used in the production of all types of moldings. These may be produced for example by injection molding, extrusion and blow molding processes. A further form of processing is the production of moldings by thermoforming from prefabricated sheets or films.

Examples of such moldings are films, profiles, all types of housing sections, e.g. for domestic appliances such as juice extractors, coffee machines, mixers; for office equipment such as monitors, printers, copiers; also plates, pipes, electric wiring ducts, profiles for the construction sector, interior fittings and exterior applications; parts for the electrical engineering sector such as switches and plugs and interior and exterior automotive parts.

The compositions according to the invention may in particular be used to produce the following moldings, for example:

Interior fittings for rail vehicles, ships, aircraft, buses and cars, housings for electrical appliances containing miniature transformers, housings for equipment for information dissemination and transfer, housings and cladding for medical purposes, massage equipment and housings, two-dimensional prefabricated wall panels, housings for safety equipment, moldings for sanitary and bathroom equipment, and housings for gardening implements.

The following examples are intended solely to illustrate the invention in more detail.

EXAMPLES

I) Phosphorus-silicon Compound (referred to as component E3 in tables 1 and 2)

1.) Production of a Phosphorylated Silane

In a three-neck flask fitted with a thermometer and reflux condenser 19.6 g (158 mmol) dimethyl methane phosphonate are added dropwise at room temperature to 20.0 g (79 mmol) diphenyl dichlorosilane under an argon protective gas atmosphere. On completion of the addition the reaction mixture is stirred until no more gas (methyl chloride) escapes.

2.) Oligomerisation of the Phosphorylated Silane

The reaction mixture from 1) is thermally oligomerised at 150° C. and the dimethyl methane phosphonate that is produced is continuously removed by distillation in vacuo under a pressure of 0.08 mbar until the reaction mixture reaches a constant weight. A colourless, highly viscous liquid is produced, which solidifies to a solid, glassy substance when cooled to room temperature.

Yield: 20.7 g

Melting point: approx. 54° C.

Elemental analysis: carbon 55%, silicon 12%, phosphorus 10%

Thermogravimetric analysis: 4 wt. % loss of mass at 280° C., measured in a nitrogen stream at a heating-up rate of 20 K/h Molecular weight: $M_w$=963 g/mol (measured by gel permeation chromatography using a 260 nm DAD UV detector; quantitative analysis was performed by means of a calibration relation valid for polysiloxanes at room temperature in dichloromethane)

The results of the characterization indicate that in the sum of steps 1) and 2) the reaction

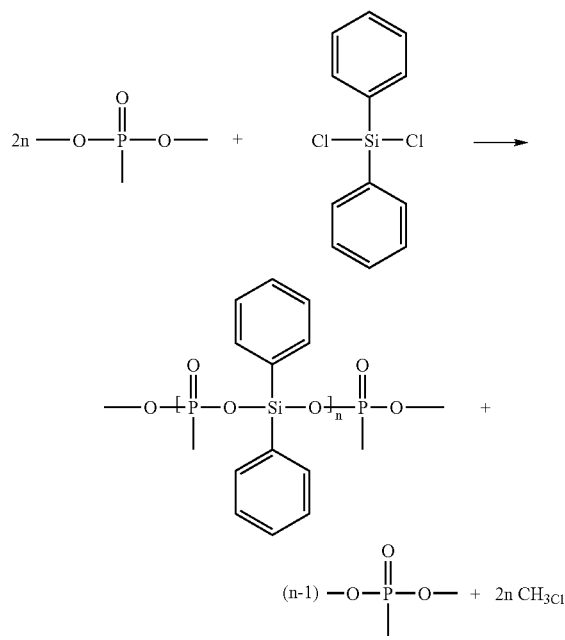

proceeded in accordance with the literature *Phosphorus, Sulfur, and Silicon* 68 (1992) 107–114 and substantially a product having a weight-average n value of approximately 3 was produced.

II) Polycarbonate Compositions

The mixtures are produced by melt compounding on a TS/I-02 mini-extruder (DSM) at a melt temperature of 290° C. (PC/ABS compositions) or 310° C. (PC compositions). All specimens used are obtained by injection molding on a TS/I-01 injection molding machine (DSM) connected to the extruder. The mold temperature is 80° C.

Component A1

Linear polycarbonate based on bisphenol A with a relative solution viscosity of 1.28, measured in $CH_2Cl_2$ as solvent at 25° C. and in a concentration of 0.5 g/100 ml.

Component A2

Linear polycarbonate based on bisphenol A with a relative solution viscosity of 1.26, measured in $CH_2Cl_2$ as solvent at 25° C. and in a concentration of 0.5 g/100 ml.

Component B

Graft polymer of 40 parts by weight of a copolymer of styrene and acrylonitrile in the ratio 73:27 on 60 parts by weight of particulate crosslinked polybutadiene rubber (average particle diameter $d_{50}$=0.3 μm), produced by emulsion polymerisation.

Component C1

Tetrafluoroethylene polymer as a coagulated mixture of a graft polymer emulsion according to the aforementioned component B in water and a tetrafluoroethylene polymer emulsion in water. The ratio by weight of graft polymer B to the tetrafluoroethylene polymer in the mixture is 90 wt. % to 10 wt. %. The tetrafluoroethylene polymer emulsion has a solids content of 60 wt. %; the average particle diameter is between 0.05 and 0.5 μm. The graft polymer emulsion has a solids content of 34 wt. %.

The emulsion of the tetrafluoroethylene polymer (Teflon® 30 N from DuPont) is mixed with the emulsion of the graft polymer B and stabilised with 1.8 wt. %, relative to polymer solids, of phenolic antioxidants. The mixture is coagulated with an aqueous solution of $MgSO_4$ (Epsom salts) and acetic acid at pH 4 to 5 and at a temperature of 85 to 95° C., filtered and washed until it is practically free from electrolytes, then freed from the bulk of the water by centrifuging and subsequently dried to a powder at 100° C.

Component D1

Pentaerythritol tetrastearate (PETS) as release agent

Component D2

Phosphite stabiliser

Component E1

Disflamol® TP: triphenyl phosphate supplied by Bayer AG, Leverkusen, Germany

Component E2

Silres® SY 300: silanol-functional solid phenyl propyl polysiloxane supplied by Wacker-Chemie GmbH, Munich, Germany Testing the Properties of the Molding Compositions According to the Invention The flame resistance of the compositions is evaluated in a total of three test procedures.

A first test is performed by reference to the glow wire test in accordance with IEC 60695-2-12. A glowing metal wire at a temperature of 960° C. is pressed for 30 s against specimens having a wall thickness of 1.5 mm and the degree of flame resistance of the composition is assessed from the maximum flame height during the period of contact with the incandescent wire and the subsequent burning time and from the burning time after removal of the incandescent wire. The test is regarded as having been passed if the burning time following removal of the incandescent wire does not exceed 30 s. Reduced maximum flame heights are taken as an indicator of improved flame resistance but have no influence on whether the test is passed.

A second test to assess the flame resistance of the compositions is performed by reference to UL-Subj. 94 V on test pieces of thickness 1.5 mm. A defined pilot flame is applied from below to vertically mounted test pieces for 10 s, the time for the flame to go out determined in order then to reapply the pilot flame for 10 s and again to determine the time for the flame to go out. This test is performed on a total of 5 test pieces. The sum of the 10 individual burning times is determined, along with the tendency of the material to drip as it burns during the test. The best rating, V-0, is given to materials that do not drip as they burn, for which the total burning time does not exceed 50 s and for which no individual burning time is longer than 10 s. The rating V-2 permits the material to drip as it burns. The test is classed as having been failed if the total burning time for the ten individual applications of the flame exceeds 250 s or if at least one individual burning time is longer than 30 s.

A third test to assess the flame resistance of the compositions is performed by reference to the LOI test (low oxygen index) as defined in ASTM D 2863 on test pieces of wall thickness 4.0 mm, the upper end of vertically mounted specimens being ignited in a nitrogen-oxygen atmosphere having a variable $O_2$ content and the oxygen content at which the specimen just goes out of its own accord being determined.

The tendency of volatile components to bleed during processing ("juicing") is assessed by means of a thermogravimetric analysis performed dynamically in a nitrogen stream. The loss of mass of the composition at 280° C., determined at a heating-up rate of 20 K/min, is used as reference.

TABLE 1

| | Tests in polycarbonate | | | |
|---|---|---|---|---|
| Component (values in parts by weight) | 1 (comparison) | 2 | 3 | 4 |
| A1 (PC) | 100 | 100 | 100 | 100 |
| E3 (phosphorus-silicon compound) | — | 1 | 3 | 5 |
| Rating in UL94V test | V-2 | V-2 | V-0 | V-0 |
| Total burning time in UL94V test [s] | 56 | 15 | 0 | 0 |
| Glow wire test - flame height [mm] | 83 | 55 | 45 | 47 |
| Glow wire test - burning time [s] | >30 | 20 | 3 | 1 |
| Glow wire test passed | no | yes | yes | yes |
| LOI screening test [% $O_2$] | 26 | 28 | 29 | 29 |
| TGA - loss of mass [%] | 0.3 | 0.2 | 0.4 | 0.7 |

The data in Table 1 shows that pure polycarbonate may be rendered flame resistant with low-volatility phosphorus-silicon compounds. The compositions from Examples 2 to 4 provide transparent specimens, which shows the compatibility of the additive with the polymer phase. Even with such a low concentration as only 1 part by weight, clear improvements in flame resistancemay be achieved with the phosphorus-silicon compound (burning time in UL94V test reduced, incandescent wire test passed and LOI increased). With an addition of 3 wt. % of the phosphorus-silicon compound a V-0 rating is even achieved in the UL94V test.

TABLE 2

| | Tests in PC/ABS blends | | | | |
|---|---|---|---|---|---|
| Components (values in parts by weight) | 5 (comparison) | 6 | 7 | 8 (comparison) | 9 (comparison) |
| A2 (PC) | 94.5 | 94.5 | 94.5 | 94.5 | 94.5 |
| C1 (PTFE/ABS graft polymer coagulate) | 5.0 | 5.0 | 5.0 | 5.0 | 5.0 |
| D1 (release agent) | 0.4 | 0.4 | 0.4 | 0.4 | 0.4 |
| D2 (stabiliser) | 0.1 | 0.1 | 0.1 | 0.1 | 0.1 |
| E1 (phosphoric acid ester) | — | — | — | 5 | — |
| E2 (silicone) | — | — | — | — | 5 |
| E3 (phosphorus-silicon compound) | — | 3 | 5 | — | — |
| B (ABS graft polymer from C1) | 4.5 | 4.5 | 4.5 | 4.5 | 4.5 |
| PTFE from C1 | 0.5 | 0.5 | 0.5 | 0.5 | 0.5 |
| Rating in UL94V test | NP | V-2 | V-2 | NP | NP |
| Total burning time in UL94V test [s] | >250 | 75 | 30 | >250 | >250 |
| Glow wire test-max. flame height [mm] | 110 | 97 | 92 | 80 | 100 |
| Glow wire test-burning time [s] | >30 | 9 | 9 | 10 | >30 |

TABLE 2-continued

| | Tests in PC/ABS blends | | | | |
|---|---|---|---|---|---|
| Components (values in parts by weight) | 5 (comparison) | 6 | 7 | 8 (comparison) | 9 (comparison) |
| Glow wire test passed | no | yes | yes | yes | no |
| LOI screening test [% $O_2$] | 25 | 26 | 27 | 27 | 28 |
| TGA-loss of mass [%] | 0.4 | 0.6 | 0.9 | 1.8 | 0.3 |

NP = test not passed

The data in Table 2 shows that PC/ABS blends too may be rendered flame resistant with the phosphorus-silicon compounds. V-2 ratings may be achieved in the UL94V test, and the glow wire test is passed. The LOI also shows a rise. When used in the same concentration, phosphoric acid esters (comparative example 8) display a poorer performance in the UL94V test and (in the case of the more efficiently fire-resistant monomeric phosphoric acid esters) greater "juicing". In the same concentration partially aromatic silicones (comparative example 9) display a poorer performance in the UL94V test and in the glow wire test. When a concentration of 5 parts by weight of silicone was used, the two tests were no longer passed.

Although the invention has been described in detail in the foregoing for the purpose of illustration, it is to be understood that such detail is solely for that purpose and that variationsmay be made therein by those skilled in the art without departing from the spirit and scope of the invention except as it may be limited by the claims.

What is claimed is:

1. A poly(ester)carbonate composition comprising a poly(ester) carbonate and at least one phosphorus-silicon compound, said compound having a phosphorus content of 1 to 20% and a silicon content of 1 to 20%, and characterized in that its weight loss assessed by thermogravimetric analysis under nitrogen inert gas at a heating rate of 20° K/mm, at 280° C. is less than 30% the cited percents, all occurrences, referring to the weight of the phosphorus-silicon compounds, wherein the phosphorus-silicon compound conforms to general formula (III),

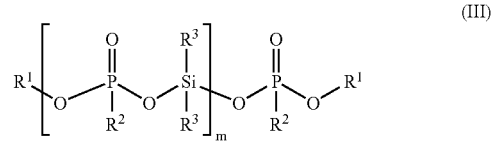

wherein $R^1$ mutually independently represents hydrogen or $C_1$–$C_4$ alkyl, $R^2$ represents a member selected from the group consisting of aryl radical, alkyl radical, aryloxy radical, alkoxy radical and hydrogen and $R^3$ mutually independently represents a member selected from the group consisting of alkyl radical, aryl radical and aryl radical substituted with $C_1$–$C_4$ alkyl and m denotes 2 to 1000.

2. The composition according to claim 1 wherein the phosphorus content is 3 to 17 wt. % and the silicon content is 3 to 17 wt. %.

3. The composition according to claim 1 wherein the phosphorus content is 5 to 15 wt. % and the silicon content is 5 to 15 wt. %.

4. The composition according to claim 1 wherein the phosphorus-silicon compound, is the product of thermally induced oligomerization from at least one phosphorylated silane, said silane being the product of a reaction of at least one phosphonic acid ester having the general formula (I) with at least one halosilane having the general formula (II),

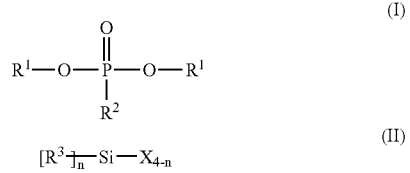

wherein
- n is 0 to 3,
- X represents a halogen atom,
- $R^1$ mutually independently represents hydrogen or $C_1$–$C_4$ alkyl,
- $R^2$ represents a member selected from the group consisting of aryl radical, alkyl radical, aryloxy radical, alkoxy radical and hydrogen and
- $R^3$ mutually independently represents a member selected from the group consisting of alkyl radical, aryl radical and aryl radical substituted with $C_1$–$C_4$ alkyl.

5. The composition according to claim 1 wherein the phosphorus-silicon compound is one in which at least 10 mol % of the substituents $R^2$ and $R^3$ are aryl or aryloxy radicals.

6. The composition according to claim 1 wherein at least 40 mol % of the substituents $R^2$ and $R^3$ are aryl or aryloxy radicals.

7. The composition according to claim 1 containing 0.05 to 30 parts by weight of the phosphorus-silicon compound, relative to 100 parts by weight of a polycarbonate composition.

8. The composition according to claim 1 containing 0.1 to 20 parts by weight of the phosphorus-silicon compound, relative to 100 parts by weight of a polycarbonate composition.

9. The composition according to claim 1 containing 1.5 to 8 parts by weight of the phosphorus-silicon compound, relative to 100 parts by weight of a polycarbonate composition.

10. The composition according to claim 1 in which the poly(ester)carbonate A) is present in an amount of A) 60 to 100 parts by weight, the composition further containing B) 0 to 40 parts by weight of at least one polymer selected from the group consisting of vinyl (co)polymers, rubber-modified vinyl (co)polymers and aromatic polyesters, C) 0 to 5 parts by weight of fluorinated polyolefin and D) up to 20 parts by weight of other polymers and/or conventional polymer additives, the parts by weight of components A to D totalling 100.

11. The composition according to claim 10, wherein component B) is a graft polymer of
- B.1 5 to 95 wt. % of monomers of a mixture comprising 50 to 99 wt. % of at least one member selected from the group consisting of vinyl aromatic, ring-substituted vinyl aromatic and methacrylic acid ($C_1$–$C_8$) alkyl ester and 1 to 50 wt. % of at least one member selected from the group consisting of vinyl cyanides, (meth)acrylic acid ($C_1$–$C_8$) alkyl esters and derivatives of unsaturated carboxylic acids on
- B.2 95 to 5 wt. % of one or more rubbers having glass transition temperatures <0° C. as graft base.

12. The composition according to claim 11, wherein the mixture B.1 contains 10 to 90 wt. % of at least one monomer selected from the group consisting of styrene, a-methyl styrene and methyl methacrylate and 90 to 10 wt. % of at least one monomer selected from the group consisting of acrylonitrile, maleic anhydride and methyl methacrylate.

13. Composition according to claim 11, wherein the graft base B.2 is at least one member selected from the group consisting of diene rubber, EP(D)M rubber, acrylate rubber, silicone rubber and silicone-acrylate composite rubber.

14. The composition according to claim 10, wherein vinyl (co)polymer is the product of polymerization of 50 to 99. % of at least one monomer selected from the group consisting of styrene, α-methyl styrene, p-methyl styrene, p-chlorostyrene and methacrylic acid ($C_1$ to $C_8$) alkyl ester, and 1 to 50% of at least one monomer selected from the group consisting of acrylonitrile, methacrylonitrile and (meth) acrylic acid ($C_1$–$C_8$) alkyl ester, the percents, both occurrences being relative to the weight of the vinyl(co)polymer.

15. The composition according to claim 1 further containing at least one additive selected from the group consisting of heat stabilizer, hydrolysis stabilizer, light stabilizer, flow control agent, processing aid, lubricant, release agent, UV absorber, antioxidant, antistatic, preservative, coupling agent, filler, reinforcing agent, dye, pigment, nucleating agent, foaming agent, flame-retarding additive other than a phosphorus-silicon compound, and smoke suppressant.

16. A molded article comprising the composition according to claim 1.

* * * * *